NOISE MODULATION SYSTEM
Filed Jan. 30, 1959
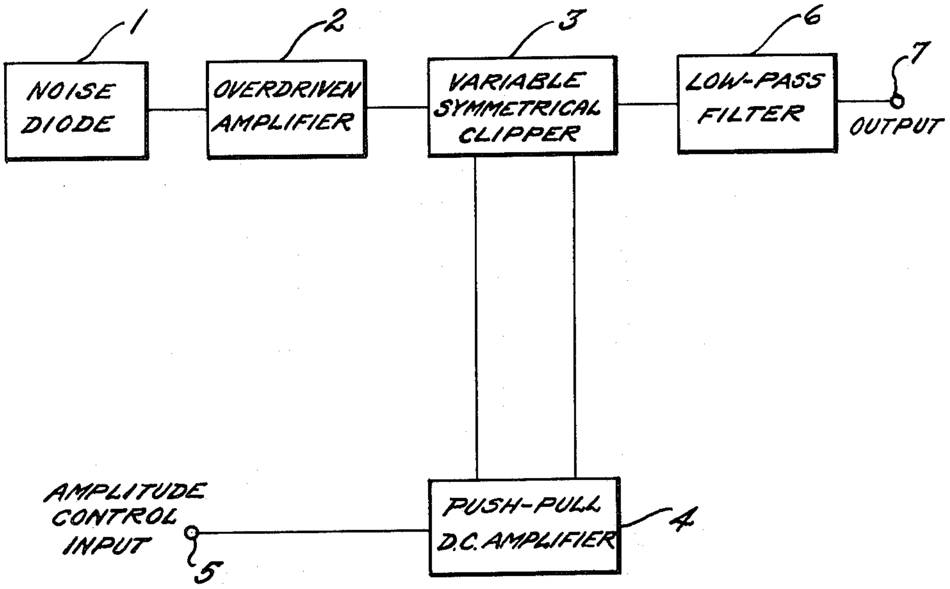
INVENTOR.
GEORGE ROSEN
BY Wade Koontz and George Fine
ATTORNEYS

United States Patent Office 3,028,562
Patented Apr. 3, 1962

3,028,562

NOISE MODULATION SYSTEM

George Rosen, Philadelphia, Pa., assignor to the United States of America as represented by the Secretary of the Air Force Filed Jan. 30, 1959, Ser. No. 790,310
5 Claims. (Cl. 332—68)

The present invention relates to a noise generator system and more particularly to a noise generator system providing linear modulation of the noise amplitude.

Precise control of noise excitation of speech synthesizers, such as disclosed in my copending patent application entitled Dynamic Analog Speech Synthesizer, Serial No. 757,170, filed Aug. 25, 1958, is not possible with conventional modulation. Since reproduction of speech in a synthesizer must be intelligible, it is highly desirable to attain precise control of the noise source that excites said synthesizer.

In the previous art, the conventional modulator had a highly nonlinear control voltage-versus-output characteristic with tails in the region of cut-off. Also it had distortion whose character varies with gain. Thus the shape of the noise amplitude distribution at the output of a conventional modulator depends on gain setting. In the present invention these difficulties have been circumvented by utilizing the properties of the signal.

In accordance with the present invention a novel noise generator system is provided. The modulator utilized therein is a physical implementation of the central limit theorem.

The theorem states that if $$y=\sum_{1}^{n} x_i$$

and if the $x_i$ are statistically independent and are distributed with finite mean and variance, then the distribution of $y$ approaches the Gaussian as $n$ approaches infinity, regardless of the exact form of the $x_i$ distributions.

The novel system therefore provides a noise diode which feeds an overdriven amplifier whose output is ideally a rectangular wave with random zero-crossing times and whose two values are equiprobable and symmetrical about zero. Such a wave has a zero mean. The actual output distribution clusters about two values in a manner that approximates the ideal distribution, and the output waveform has significant components up to 200 kc. Symmetrical clipping of the ideal rectangular wave does not distort it but merely changes its amplitude scale. This clipping is provided by a variable symmetrical clipper. A push-pull D.C. amplifier acts as a threshold voltage source for the clipper so that the clipping limits can change in response to a control voltage. Hence this voltage controls the amplitude scale of the clipper output. The clipper is conventional and is of the type shown and described on pages 618—619 of Terman's Electronic and Radio Engineering (4th edition) published in 1955 by McGraw-Hill Book Co. Inc. This clipper circuit clips both positive and negative peaks of a signal at the same voltage magnitude and is more generally known as a symmetrical clipper and as previously recited, push-pull amplifier acts as a threshold voltage source for the clipper thereby achieving the aforementioned variable characteristic. A low-pass filter is fed by the output of the clipper. The input and output of the filter are bandwidth-limited to 200 kc. and to 10 kc., respectively. Each sample of the filter output can be regarded as a weighted sum of effectively twenty samples of the filter input. The conditions of the central limit theorem holds for the intended purposes, and the distribution of the filter output is approximately Gaussian, with the variance determined by the amplitude control voltage. Symmetrical circuitry operating on symmetrical waveforms yields an output with no D.C. component. The circuit is free from the "thump" that arises when a portion of the control voltage appears as an unwanted component of the output.

It is an object of the present invention to provide a novel noise generator system which includes a symmetrical-clipping noise modulator.

It is another object of the present invention to provide a noise generator system wherein the noise amplitude is modulated linearly.

It is still a further object of the present invention to provide a novel noise generator system wherein the modulation of noise is relatively distortion free.

A still further object of the present invention is to provide a novel noise generator system which includes a linear modulator operating in such a manner that clipping a rectangular pulse does not distort it but changes its amplitude.

Yet another object of the present invention is to provide a noise generator system including a novel linear modulator wherein precise control of noise amplitude modulation is achieved.

The various features of novelty which characterize this invention are pointed out with particularity in the claims annexed to and forming a part of this specification. For a better understanding of the invention, however, its advantages and specific objects obtained with its use, reference should be had to the accompanying drawing and descriptive matter in which is illustrated and described a preferred embodiment of the invention.

Referring now to the drawing, noise diode 1 generates the noise signal. The noise signal is fed to overdriven amplifier 2 whose output is a rectangular wave with random zero-crossing times and whose two values are equiprobable and symmetrical about zero. This rectangular wave has a zero mean and has significant components up to 200 kc. The rectangular waveform from overdriven amplifier 2 is fed to variable symmetrical clipper 3. Symmetrical clipping of the rectangular waveform by means of clipper 3 does not distort it but merely changes its amplitude scale. Push-pull amplifier 4 acts as a threshold voltage source for variable symmetrical clipper 3 so that clipping limits can change in response to a control voltage received from terminal 5. Hence this voltage controls the amplitude scale of variable symmetrical clipper 3 output.

Low-pass filter 6 receives its input from variable symmetrical clipper 3. The input and output of low-pass filter 6 are bandwidth limited to 200 kc. and to 10 kc., respectively. Low-pass filter 6 acts as a summing device for noise samples. The output from low-pass filter 6 is provided from output terminal 7. The output signal contains no D.C. component because of symmetrical circuitry operating on symmetrical waveforms. The noise generator system is free from "thump" that arises when a portion of the control voltage appears as an unwanted component of the output.

What is claimed is:

1. A linear noise modulator system comprising means to generate a noise signal, means to derive a zero mean rectangular waveform signal from said noise signal, said rectangular waveform signal having random zero-crossing times and whose two values are equiprobable and symmetrical about zero, means to symmetrically clip said rectangular waveform signal, means to vary the clipping limits of said symmetrical clipper in accordance with an external amplitude control voltage, and low-pass filter means adapted to receive the output signal from said symmetrical clipper and operating to produce a signal output having a Gaussian distribution.

2. A linear noise modulator system comprising means for generating a noise signal, means to convert said noise signal to a zero-mean symmetrical rectangular signal, means to symmetrically vary the amplitude scale of said rectangular signal in accordance with an external amplitude control voltage and filter means receiving said amplitude varying rectangular signal, said filter means being bandwidth limited at the input thereof at one preselected frequency and at the output thereof to another preselected frequency.

3. A linear noise modulating system comprising means to generate a noise signal, means to convert said noise signal into a symmetrical, zero mean rectangular noise signal, means to symmetrically vary the amplitude of said rectangular signal while retaining the rectangularity thereof, said amplitude variations being in accordance with an external amplitude control voltage applied thereto, and filter means receiving said amplitude varying rectangular signal, said filter means being bandwidth limited at the input thereof at one preselected frequency and at the output thereof at another preselected frequency.

4. A linear noise modulator system comprising a noise diode, an overdriven amplifier adapted to receive the output signal from said noise diode and operating to produce a symmetrical rectangular signal having a zero-mean, a variable symmetrical clipper receiving said zero-mean rectangular signal from said overdriven amplifier, a push-pull D.C. amplifier operating as a variable threshold voltage source for said variable symmetrical clipper in accordance with an external amplitude control voltage applied thereto, and a filter adapted to receive the output signal from said symmetrical clipper; said filter being bandwidth limited at the input thereof at one preselected frequency and at the output thereof at another preselected frequency.

5. A linear noise modulating system comprising means to generate a symmetrically-rectangular noise signal having a zero mean, means to symmetrically vary the amplitude limits of said rectangular noise signal in accordance with an external amplitude control voltage while retaining the rectangularity thereof, and filter means receiving said amplitude varying rectangular noise signal, said filter means being bandwidth limited at the input thereof at one preselected frequency and at the output thereof to another preselected frequency.

References Cited in the file of this patent

UNITED STATES PATENTS

| | | |
|---|---|---|
| 2,267,120 | Mathes | Dec. 23, 1941 |
| 2,406,978 | Wendt et al. | Sept. 3, 1946 |
| 2,438,927 | Labin et al. | Apr. 6, 1948 |
| 2,459,131 | Mesney | Jan. 11, 1949 |
| 2,539,774 | Gluyas | Jan. 30, 1951 |
| 2,773,185 | Fulton et al. | Dec. 4, 1956 |
| 2,784,256 | Cherry | Mar. 5, 1957 |
| 2,846,497 | Kennedy | Aug. 5, 1958 |